Sept. 15, 1925.
A. F. PARKS
COMPRESSOR VALVE
Filed Aug. 15, 1924
1,553,323
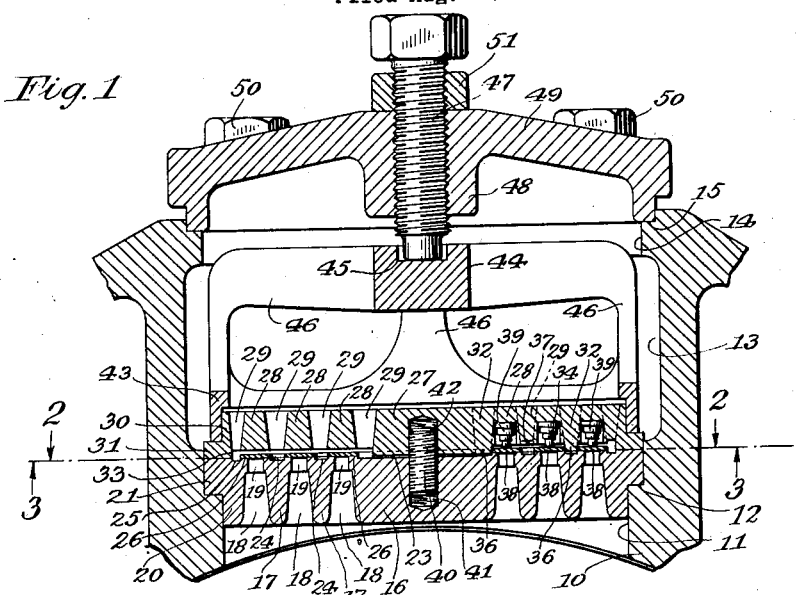
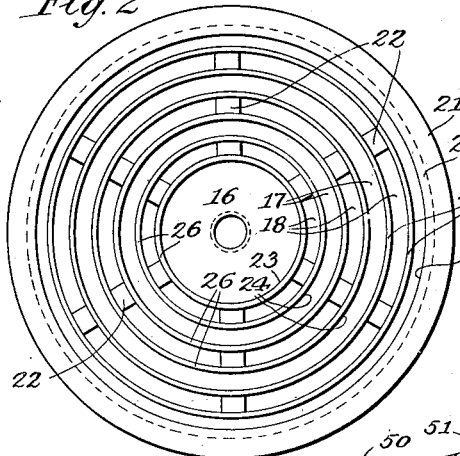
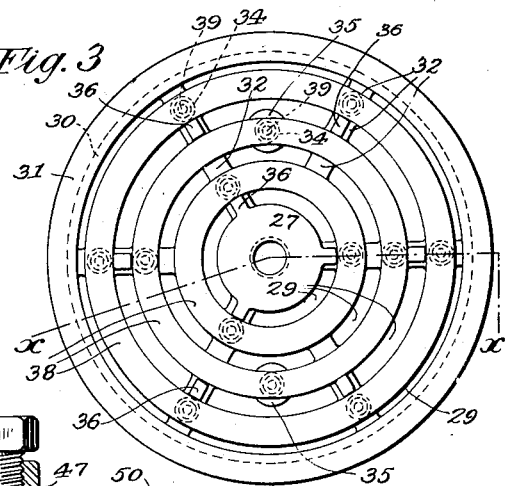
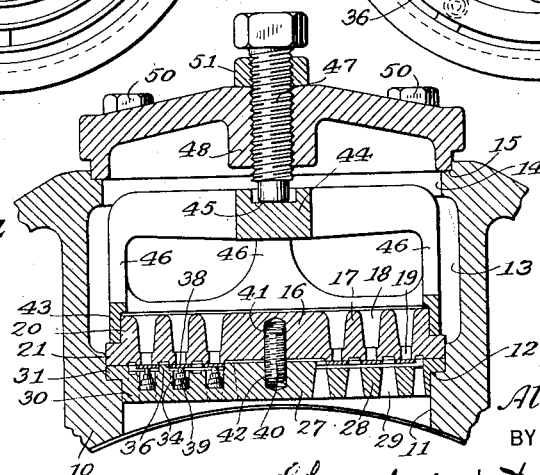
INVENTOR
Albert F. Parks
BY
Chamberlain + Newman
ATTORNEYS Patented Sept. 15, 1925.

1,553,323

UNITED STATES PATENT OFFICE.

ALBERT F. PARKS, OF SOUTH NORWALK, CONNECTICUT, ASSIGNOR TO THE NORWALK COMPANY, OF SOUTH NORWALK, CONNECTICUT, A CORPORATION OF DELAWARE.

COMPRESSOR VALVE.

Application filed August 15, 1924. Serial No. 732,238.

*To all whom it may concern:*

Be it known that ALBERT F. PARKS, a citizen of the United States, and resident of South Norwalk, in the county of Fairfield and State of Connecticut, has invented certain new and useful Improvements in Compressor Valves, of which the following is a specification.

The present invention relates to an improved compressor valve, and particularly a valve of the so-called ring plate type, adapted for use in air compressors.

An object of the invention is to provide a valve of this character of simple construction, reliable in operation, and which may be readily installed as a unit assembly in the compressor cylinder, as either an inlet or an outlet valve.

A further object is to provide an improved valve seat and guard assembly, by means of which the valve parts are assembled as a unit, and in which a sealed relation is produced without packing or otherwise sealing the fastening means, the valve being free, therefore, of any parts subject to rapid deterioration or frequent refitting.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a vertical sectional view of a valve, according to the present embodiment of the invention, the same being positioned for use as an outlet valve, and the section being taken along the line x—x of the inverted plan view, Fig. 3;

Fig. 2 is a plan view of the valve seat part, being taken along the line 2—2 of Fig. 1;

Fig. 3 is an inverted plan view of the valve guard part, and the ring plate valves, being taken along the line 3—3 of Fig. 1; and Fig. 4 is a vertical sectional view of the valve, the same being positioned for use as an inlet valve.

Similar reference characters indicate corresponding parts throughout the several figures of the drawings.

Referring to the drawings, the cylinder wall 10 of the compressor is provided with an outlet port 11, Fig. 1, (inlet port, Fig. 4) having an annular valve seating shoulder 12, and opening into a chamber 13, provided in radial alignment with the port 11 with a circular opening 14 having an annular bonnet seating shoulder 15.

The valve proper, shown in Fig. 1 in its position as an outlet or discharge valve, comprises a valve seat member consisting of a central hub portion 16, a series of annular concentrically arranged and spaced rings 17, tapered in cross section to provide converging channels or passages 18, the upper ends of said channels being reduced and straight sided, as at 19, and an annular outer ring 20 having a flange 21 adapted to seat upon the valve seating shoulder 12, the rings and hub being integrally connected by radial ribs 22. The upper or valve seating surface of the member is recessed, as at 23, in the hub, 24 in the rings 17, and 25 in the ring 20, in spaced relation to the end portions 19 of the annular channels to provide raised annular valve seating portions 26 at each edge of said channels, which portions are machined to provide tight fitting seats for the valve ring plates.

A valve guard or stop member, cooperating with the seat member, comprises a central hub portion 27 of less diameter than the hub 16, a series of annular concentrically arranged and spaced rings 28, tapered in cross section to provide diverging channels 29, the reduced ends of said channels adapted to oppose the rings 17 of the seat member, while the relatively wide ends of the rings 28 oppose the channels 18, and an outer ring portion 30 having a flange 31 adapted to seat upon the flange 21 of the seat member, the hub and rings being integrally connected by radial ribs 32.

The ground surface of the flange 31 of the outer ring fits snugly upon the flange 21 of the seat member, while the inner surface of the hub 27 is slightly spaced from the recessed surface 23 of the hub 16 to insure a tight seal fit of the outer rings without interference due to any establishment of contact between the opposed hub faces. The inner surfaces of the rings 28 are machined to a level spaced from the valve seating surface of the seating member to provide a valve space 33.

The rings 28 are provided at suitably spaced points with pockets 34 adapted to receive the valve springs, presently to be described, the majority of these pockets being in line with the ribs 32, while certain of them between the ribs are provided in thickened portions 35 of the ring structure.

The ribs 32, between the hub and the inner ring 28, and between the second ring 28 and the outer ring 28, are provided with projecting lug portions 36 adapted to form guides and positioning means for the valve ring plates, while the ribs between the first and second rings 28 and the outer ring 28 and the ring 30 are recessed at their inner ends, as at 37, to insure close fitting of the ring plates against the stop surfaces of said rings 28.

The valve ring plates 38, three in the present embodiment, are of flat circular form, and of respective diameters to close the ends 19 of the channels 18, seating upon the surfaces 26, and being positioned and guided by the lugs 36. Volute springs 39 are seated in the pockets 34 and normally press the ring plates closed against the seating surfaces 26.

The valve unit is assembled by means of a central threaded stud 40 engaged in threaded pockets 41 and 42 of the respective hubs 16 and 27, the threads of the stud fitting the threads of the pockets loosely, the seat and guard members being screwed upon the stud until their outer ground surfaces come together and form a tight sealed joint. The stud merely holds the valve parts in position to enable the assembly or valve unit to be placed in the port 11 of the cylinder, and as soon as the assembly is made fast in the cylinder the stud plays no part in the action of the valve. Due to the looseness of its threads in the threaded pockets 41 and 42, the stud is free, and therefore in no way effects any expansion or contraction that the valve may be subjected to. The pockets 41 and 42 in the valve seat and guard, it will be noted, are not drilled through, so that there is no necessity for providing a seal against leakage for the holding stud.

When the valve assembly is seated in the port 11 upon the shoulder 12 it is secured by means of a yoke member, consisting of a ring 43 engaging the flange 31 of the guard member, a central hub portion 44 having a pocket 45, and angular radial arms 46, said yoke member being clamped down by means of a hold-down set-screw 47 engaged in the pocket 45 and screwed through the central hub portion 48 of a bonnet 49 seated at its outer flanged edge upon the shoulder 15 of the opening 14, and secured by fastening bolts 50. A lock nut 51 is engaged upon the set-screw and bears upon the upper surface of the bonnet.

In Fig. 1 the valve is shown in position to function as an outlet or discharge valve, outward pressure in the cylinder raising the valve ring plates against the pressure of the springs 39, thereby opening the channels 18 of the seat member and permitting passage of air through the valve space 33, and out through the channels 29 of the guard member.

In using the valve as an inlet valve, the valve assembly is merely inverted in the inlet port of the cylinder, as shown in Fig. 4, whereupon suction in the cylinder opens the valve ring plates in a similar manner to the action of pressure in the outlet valve to admit air to the cylinder.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:

1. In a valve for compressors or the like, a valve assembly unit comprising a valve seat member having openings, a valve guard member having openings, valve means movably mounted between said seat and guard members adapted to open and close said openings of the seat member to establish and close communication with the openings of the guard member, opposed hub portions on said seat and valve members having threaded sockets extending partially through said hubs from the adjacent faces, and an internal threaded stud screwed into said sockets to connect said members in assembled relation, its threads having loose engagement with the threads of said sockets whereby the members may be tightly pressed together independently of said threaded stud.

2. In a valve for compressors or the like, a valve assembly unit comprising a valve seat member having openings, a valve guard member having openings, valve means movably mounted between said seat and guard members adapted to open and close said openings of the seat member to establish and close communication with the openings of the guard member, opposed hub portions on said seat and guard members having threaded sockets extending partially through said hubs from the adjacent faces, opposed marginal rim portions on said seat and guard members adapted to have contacting relation with each other, and an internal threaded stud screwed into said sockets to connect said members in assembled relation and adapted to draw said rim portions into loosely contacting relation, its threads having loose engagement with the threads of said sockets whereby the members may be tightly pressed together at their rim portions independently of said threaded stud.

3. In a valve for compressors or the like, a valve assembly unit comprising a valve seat member having openings, a valve guard member having openings, valve means movably mounted between said seat and guard members adapted to open and close said openings of the seat member to establish and close communication with the openings of the guard member, opposed marginal rim portions on said seat and guard members adapted to have contacting relation with each other, opposed hub portions on said seat and guard members having their adjacent faces spaced from each other so as not to interfere with the contacting relation of the marginal rim portions and having threaded sockets extending partially through said hubs from said adjacent faces, and an internal threaded stud screwed into said sockets to connect said members in assembled relation and draw said rim portions into loosely contacting relation.

4. In a valve for compressors or the like, a valve assembly unit comprising a valve seat member having openings, a valve guard member having openings, valve means movably mounted between said seat and guard members adapted to open and close said openings of the seat members to establish and close communication with the openings of the guard member, opposed hub portions on said seat and guard members having threaded sockets extending partially through said hubs from the adjacent faces, opposed marginal rim portions on said seat and guard members adapted to have contacting relation with each other, threaded means for loosely connecting said seat and guard members in assembled relation, whereby the members may be tightly pressed together independently of said connecting means, and a clamping yoke member for said assembly unit including an annular ring portion adapted to clampingly engage the marginal portion of said assembly unit to secure the same and to tightly press said marginal rim portions of said seat and guard members together.

Signed at Bridgeport this 11th day of August, 1924.

ALBERT F. PARKS.